US011022031B2

United States Patent
Mcewen et al.

(10) Patent No.: US 11,022,031 B2
(45) Date of Patent: Jun. 1, 2021

(54) TURBINE ARRANGEMENT (71) Applicant: CUMMINS LTD, Huddersfield (GB)

(72) Inventors: James Alexander Mcewen, Huddersfield (GB); Thomas Morton, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 292 days.

(21) Appl. No.: 16/085,855

(22) PCT Filed: Mar. 17, 2017

(86) PCT No.: PCT/GB2017/050751
§ 371 (c)(1),
(2) Date: Sep. 17, 2018

(87) PCT Pub. No.: WO2017/158378
PCT Pub. Date: Sep. 21, 2017

(65) Prior Publication Data
US 2020/0340393 A1     Oct. 29, 2020

(30) Foreign Application Priority Data
Mar. 18, 2016 (GB) .................. 1604650

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F05D 2220/40* (2013.01); *F05D 2260/606* (2013.01)

(58) Field of Classification Search
CPC ...... F02B 37/18; F02B 37/183; F02B 37/186; F02B 37/025; F01D 17/105;
(Continued)

(56) References Cited

U.S. PATENT DOCUMENTS 4,171,936 A * 10/1979 Hageman ................ F02B 39/00
  417/407
4,307,687 A * 12/1981 Holstein ................ F02B 41/06
  123/52.3
(Continued)

FOREIGN PATENT DOCUMENTS

CA    2 748 878       2/2013
CA    2748878 A1      2/2013
(Continued)

OTHER PUBLICATIONS

Ohinese Office Action and Summary, issued by the Chinese Patent Office dated Sep. 1, 2020 for Chinese Application 201780029288.7; 10 pages.
(Continued)

*Primary Examiner* — J. Todd Newton
(74) *Attorney, Agent, or Firm* — Faegre Drinker Biddle & Reath LLP (57) ABSTRACT

The turbine arrangement includes a turbine including a turbine housing which defines a turbine cavity within which a turbine wheel is supported, an inlet upstream of the wheel and an outlet downstream. The arrangement also includes a flow passage configured to permit gas flow without interacting with the wheel, and a valve member moveable between an open configuration wherein gas may flow through the flow passage, and a closed configuration wherein gas is substantially prevented from flowing, a first actuator portion for moving the valve member between the configurations, and a second actuator portion in gas flow communication with a portion of the arrangement upstream of the wheel via an actuator gas passage. The arrangement is configured such that gas may flow through the actuator gas passage to the second actuator portion, where it acts on the (Continued)

second actuator portion to urge the valve member towards the closed configuration.

22 Claims, 5 Drawing Sheets (58) Field of Classification Search
CPC .. F05D 2260/606; F05D 2220/40; F02C 6/12; F16K 31/1223; F16K 31/143; F16K 31/163; F16K 31/363; F16K 31/383
USPC ......................................................... 415/144
See application file for complete search history.

(56) References Cited

U.S. PATENT DOCUMENTS

| | | | |
|---|---|---|---|
| 4,339,922 A * | 7/1982 | Navarro | F02B 37/007 60/602 |
| 4,418,535 A * | 12/1983 | Ecomard | G05D 16/0655 60/602 |
| 4,791,906 A * | 12/1988 | Ecomard | F16K 31/385 123/564 |
| 4,928,733 A | 5/1990 | Sudolnik et al. | |
| 5,769,612 A * | 6/1998 | Thelen | F02B 33/38 417/310 |
| 8,844,283 B2 | 9/2014 | Kühlmeyer et al. | |
| 2013/0186085 A1 * | 7/2013 | Kuhlmeyer | F02B 37/186 60/602 |
| 2014/0096675 A1 * | 4/2014 | Fletcher | F15B 15/1466 91/1 |
| 2014/0271138 A1 * | 9/2014 | Markyvech | F01D 17/105 415/146 |
| 2015/0315963 A1 * | 11/2015 | Graichen | G05D 7/0635 415/148 |
| 2017/0074212 A1 * | 3/2017 | Lorts | F02D 19/0607 |

FOREIGN PATENT DOCUMENTS

| | | |
|---|---|---|
| CN | 101163889 A | 4/2008 |
| CN | 102817698 A | 12/2012 |
| CN | 103097689 A | 5/2013 |
| DE | 10 2010 044 683 | 3/2012 |
| EP | 2508730 A2 | 10/2012 |
| GB | 2 068 455 | 8/1981 |
| GB | 2068455 A | 8/1981 |
| WO | 2013/019468 | 2/2013 |
| WO | 2013019468 A1 | 2/2013 |

OTHER PUBLICATIONS

International Search Report and Written Opinion dated May 24, 2017 in International Application No. PCT/GB2017/050751.
Search Report issued by the United Kingdom Intellectual Property Office, dated Sep. 19, 2016, for Application No. GB1604650.0; 3 pages.

* cited by examiner

TURBINE ARRANGEMENT

RELATED APPLICATIONS

The present application is a National Stage Application under 35 USC § 371 of PCT Application No. PCT/GB2017/050751, filed Mar. 17, 2017, which claims priority to U.K. Application No. 1604650.0, filed Mar. 18, 2016, the entire disclosures of which being hereby incorporated herein by reference.

TECHNICAL FIELD

The present disclosure relates to a turbine and in particular to a turbine having a wastegate to allow gas to bypass the turbine wheel. The turbine may form part of a turbocharger or power turbine.

BACKGROUND

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, which uses the rotational energy of the rotor to compress a fluid.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine cavity within which the turbine wheel is mounted; an annular inlet passageway defined in the housing between facing radially extending walls arranged around the turbine cavity; an inlet arranged around the inlet passageway; and an outlet passageway extending from the turbine cavity. The passageways and chamber communicate such that pressurised exhaust gas admitted to the inlet flows through the inlet passageway to the outlet passageway via the turbine cavity and rotates the turbine wheel. It is known to improve turbine performance by providing vanes, referred to as nozzle vanes, in the inlet passageway so as to deflect gas flowing through the inlet passageway towards the direction of rotation of the turbine wheel. Turbines of this kind may be of a fixed or variable geometry type. Variable geometry turbines differ from fixed geometry turbines in that the size of the inlet passageway can be varied to optimise gas flow velocities over a range of mass flow rates so that the power output of the turbine can be varied in line with varying engine demands. For instance, when the volume of exhaust gas being delivered to the turbine is relatively low, the velocity of the gas reaching the turbine wheel is maintained at a level which ensures efficient turbine operation by reducing the size of the inlet using a variable geometry mechanism. Turbochargers provided with a variable geometry turbine are referred to as variable geometry turbochargers. Nozzle vane arrangements in variable geometry turbochargers can take different forms. Two known types of variable geometry turbine are swing vane turbochargers and sliding nozzle turbochargers.

Generally, in swing vane turbochargers the inlet size (or flow size) of a turbocharger turbine is controlled by an array of movable vanes in the turbine inlet. Each vane can pivot about an axis extending across the inlet parallel to the turbocharger shaft and aligned with a point approximately half way along the vane length. A vane actuating mechanism is provided which is linked to each of the vanes and is displaceable in a manner which causes each of the vanes to move in unison, such a movement enabling the cross sectional area available for the incoming gas and the angle of approach of the gas to the turbine wheel to be controlled.

Generally, in sliding nozzle turbochargers the vanes are fixed to an axially movable wall that slides across the inlet. The axially movable wall moves towards a facing shroud plate in order to close down the inlet and in so doing the vanes pass through apertures in the shroud plate. Alternatively, the nozzle ring is fixed to a wall of the turbine and a shroud plate is moved over the vanes to vary the size of the inlet.

The compressor of a conventional turbocharger comprises a compressor housing defining compressor chamber within which the compressor wheel is mounted such that it may rotate about an axis. The compressor also has a substantially axial inlet passageway defined by the compressor housing and a substantially annular outlet passageway defined by the compressor housing between facing radially extending walls arranged around the compressor chamber. A volute is arranged around the outlet passageway and an outlet is in flow communication with the volute. The passageways and compressor chamber communicate such that gas (for example, air) at a relatively low pressure is admitted to the inlet and is pumped, via the compressor chamber, outlet passageway and volute, to the outlet by rotation of the compressor wheel. The gas at the outlet is generally at a greater pressure (also referred to as boost pressure) than the relatively low pressure of the gas which is admitted to the inlet. The gas at the outlet may then be pumped downstream of the compressor outlet by the action of the compressor wheel.

It is known to provide a turbocharger turbine with a valve controlled bypass port referred to as a wastegate, to enable control of the turbocharger boost pressure and/or shaft speed. A wastegate valve (typically a flap type valve) is controlled to open the wastegate port (bypass port) when the boost pressure of the fluid in the compressor outlet increases towards a pre-determined level, thus allowing at least some of the exhaust gas to bypass the turbine wheel. Typically the wastegate port opens into a wastegate passage which diverts the bypass gas flow to the turbine outlet or vents it to atmosphere.

The wastegate valve may be actuated by a variety of means, including electric actuators, but is more typically actuated by a pneumatic actuator operated by boost pressure delivered by the compressor wheel. The wastegate valve actuator is typically connected to the wastegate valve by a linkage, part of which passes through an actuation conduit in the turbine housing.

In certain operating conditions of the turbine the wastegate is required to be closed and the wastegate actuator must withstand a force exerted by the gas upstream of the wastegate valve acting to try to blow open the wastegate valve. This may require a large actuator assembly capable of applying and maintaining sufficient force on the wastegate valve to withstand the force of the gas upstream of the wastegate valve. Such actuator assemblies may incur considerable cost in terms of materials and space. In addition, the load on the actuator to withstand the force on the wastegate valve may result in relatively high load duty cycles on the actuator and short actuator life. Furthermore the actuator may suffer relatively large energy loss due to self-heating where the actuator is electric.

SUMMARY

It is an object of the present disclosure to provide a turbine arrangement which obviates or mitigates the above described disadvantage or other disadvantages present in the prior art. According to the present disclosure, there is provided a turbine arrangement comprising a turbine including turbine housing defining a turbine cavity within which a turbine wheel is supported for rotation, a turbine inlet upstream of the turbine wheel and a turbine outlet downstream of the turbine wheel; a flow passage between a location upstream of the turbine wheel and a location downstream of the turbine wheel configured to permit gas to flow from said location upstream of the turbine wheel to said location downstream of the turbine wheel without interacting with the turbine wheel; and a valve arrangement comprising: a valve member moveable between open and closed configurations, wherein in the open configuration gas may flow from said location upstream of the turbine wheel to said location downstream of the turbine wheel through the flow passage, and in the closed configuration gas is substantially prevented from flowing through the flow passage; a first actuator portion connectable to an actuator for moving the valve member between the open and closed configurations; and a second actuator portion in gas flow communication with a portion of the turbine arrangement upstream of the turbine wheel via an actuator gas passage; and wherein the turbine arrangement is configured such that gas may flow from the said portion of the turbine arrangement upstream of the turbine wheel through the actuator gas passage to the second actuator portion, such that the pressure of said gas which flows through the actuator gas passage to the second actuator portion acts on the second actuator portion to urge the valve member towards the closed configuration.

The gas passage may extend from the turbine inlet. The actuator gas passage may be distinct from (i.e. not part of) the turbine inlet, the turbine cavity, the flow passage and the turbine outlet.

The disclosure provides a second actuator portion which uses the pressure of the gas from the actuator gas passage to urge the valve member towards the closed configuration. In some applications this may be useful to assist the first actuator in urging (or moving) the valve member towards the closed configuration. This may reduce the load exerted on the first actuator portion and/or reduce the force that the first actuator portion has to apply to close the valve member (hence enabling a smaller first actuator portion to be used).

As previously discussed, the flow passage extends from a location upstream of the turbine wheel to a location downstream of the turbine wheel. The flow passage is also configured to permit gas to flow from said location upstream of the turbine wheel to said location downstream of the turbine wheel without interacting with the turbine wheel.

The flow passage may be any appropriate flow passage which enables gas flowing through it to bypass the turbine wheel.

It will be appreciated that the location upstream of the turbine wheel may be any appropriate location. For example, it may be a location within the turbine, such as, the turbine inlet, or may be a location external to the turbine, such as, a location at an exhaust manifold of an engine of which the turbine forms part or at a cylinder of an engine of which the turbine forms part.

Additionally, the location downstream of the turbine wheel may be any appropriate location. For example, it may be a location within the turbine, such as, the turbine outlet, or may be a location external to the turbine, such as, a location at another part of an exhaust system of an engine of which the turbine forms part or at a location which is part of the atmosphere external to the turbine and/or engine of which the turbine forms part.

The location upstream of the turbine wheel and the location downstream of the turbine wheel may each be chosen to be any appropriate location, provided that the flow passage permits gas to flow from said location upstream of the turbine wheel to said location downstream of the turbine wheel without interacting with the turbine wheel. What is meant by this is that gas flows from the location upstream of the turbine wheel to the location downstream of the turbine wheel via the flow passage such that it does not flow to the turbine wheel itself—this means that the gas flowing through the flow passage does not impart any force on the turbine wheel. In some cases, such a flow passage may be referred to as a wastegate passage and the valve arrangement controlling such a wastegate passage may be referred to as a wastegate valve arrangement. In some embodiments, the location upstream of the turbine wheel and the location downstream of the turbine wheel may each be chosen to be any appropriate location, provided that the flow passage permits gas to flow from said location upstream of the turbine wheel to said location downstream of the turbine wheel without passing through the turbine cavity. When referring to a location as being upstream or downstream with respect to another location, it will be appreciated that this is meant with respect to the flow of gas through the turbine arrangement (usually from an engine cylinder or an engine exhaust manifold to atmosphere) whilst the turbine arrangement is in use. As such, if a location is upstream of another location then, usually, gas flowing through the turbine arrangement will reach the upstream location before it reaches the other location. It will also be appreciated that if a location is upstream or downstream of another location, then the upstream or downstream location must be located at a point to which gas flowing through the turbine arrangement can flow whilst the turbine arrangement is in use.

The turbine housing may comprise an aperture defining a portion of the flow passage such that when the valve member is in the closed configuration the aperture is covered by the valve member such that the valve member and the turbine housing form a seal that substantially prevents gas flowing through the flow passage. For example, the valve member may comprise a valve plate having a diameter larger than the aperture. In use, when the valve member is in the closed configuration the force applied to the valve member by the first and second actuator portions acts to maintain contact between the valve plate and the turbine housing such that gas is prevented from flowing between the turbine inlet and the turbine outlet via the flow passage.

The turbine housing may define a valve seat, wherein, when the valve member is in the closed configuration, the valve member contacts the valve seat to form a seal that substantially prevents gas flowing through the flow passage.

The valve member may move in a first direction between the open configuration and the closed configuration. The first direction may be a direction from the open configuration to the closed configuration. The first direction may be defined by the direction the valve member moves from the open configuration to the closed configuration (or from the closed configuration to the open configuration) immediately preceding contact being made between the valve member and the turbine housing (or immediately preceding the valve member moving out of contact with the turbine housing). For example, the valve member may move between the open and closed configurations along a linear path that is perpendicular to the valve seat. In such case the first direction is parallel to the path. In another example, the path of the valve member may be an arc. In such case, the first direction is tangential to the arc at the moment contact is made between the valve member and the turbine housing.

The second actuator portion may move in a second direction relative to the valve arrangement. For example, the second direction may be collinear to the first direction. In another example, the second direction may be at an angle to the first direction.

The forces acting on the valve member and the second actuator portion may sum to produce a net force. When the valve member is in the closed configuration, the pressure of the gas at said location upstream of the turbine wheel (e.g. in the turbine inlet) exerts a force on the valve member (e.g. valve plate). This force may be defined by the geometry of the aperture and/or valve member. Likewise, the pressure of the gas which flows through the actuator gas passage to the second actuator portion exerts a force on the second actuator portion. This force may be defined by the geometry of the second actuator portion. The valve member and the second actuator portion may be linked such that at least a component of the force acting on the valve member is transmitted to the second actuator portion, and at least a component of the force acting on the second actuator portion is transmitted to the valve member. The two transmitted forces act in substantially opposite directions and sum in to produce a net force.

The force that is transmitted from the valve member to the second actuator portion may be dependent on the projected area of the aperture normal to the first direction. For example, the aperture may be circular and the first direction may be perpendicular to the valve seat. In such case the projected area of the aperture normal to the first direction is also circular. In another example, the first direction may be inclined at an angle that is non-perpendicular to the valve seat. In such case the projected area of the aperture is elliptical.

The force that is transmitted from the second actuator portion to the valve member may be dependent on the projected area of the second actuator portion relative to the second direction. More particularly, the force that is transmitted from the second actuator portion to the valve member may be dependent on the projected area of the portion of the second actuator which is acted on (or exposed to) the gas which flows through the actuator gas passage to the second actuator portion. The projected area may be an area which is perpendicular to (or normal to) the second direction. When the valve member is in the closed configuration, the projected area of the aperture normal to the first direction may be larger than the projected area of the second actuator portion normal to the second direction, such that the net force exerted on the valve member urges the valve member towards the open configuration.

When the valve member is in the closed configuration, the projected area of the aperture normal to the first direction may be substantially equal to the projected area of the second actuator portion normal to the second direction, such that zero net force is produced on the valve member.

When the valve member is in the closed configuration, the projected area of the aperture normal to the first direction may be smaller than the projected area of the second actuator portion normal to the second direction, such that the net force exerted on the valve member urges the valve member towards the closed configuration.

Where reference is made to the projected area of the second actuator portion, this may refer to the area, of the portion of the second actuator portion which is acted on (or exposed to) the gas which flows through the actuator gas passage to the second actuator portion, which is projected on a plane normal to the second direction.

The first actuator portion may comprise an arm mounted for rotation such that rotation of the arm causes movement of the valve member between the open and closed configurations. For example, the arm may cause movement of the valve member by transmitting a torque supplied by the actuator to the valve member. The movement of the valve member may be linear or may be rotational.

The second actuator portion may be directly coupled to the valve member. For example, the second actuator portion may be in direct contact with the valve member. During use, the force exerted by the gas on the second actuator portion is substantially opposite the force exerted by the gas on the valve member such that contact is maintained between the second actuator portion and the valve member. Alternatively, the second actuator portion may form part of the valve member, such that the second actuator portion and the valve member are fixedly joined or formed of one piece. The second actuator portion may be coupled to the valve member via a linkage. For example, space constraints may dictate that the second actuator portion cannot be positioned adjacent the valve member. In such case, force may be transmitted from the second actuator portion to the valve member via a linkage. This linkage may be a lever or a series of levers such as a four-bar linkage.

The second actuator portion may comprise a piston member supported for movement within an actuation chamber, wherein the actuator gas passage connects said portion of the turbine arrangement upstream of the turbine wheel to the actuation chamber, such that gas in the actuation chamber acts on the piston member to urge the piston member to move within the actuation chamber so as to urge the valve member towards the closed configuration.

The actuation chamber may include a piston bore within which the piston member, which may have a diameter corresponding to the diameter of the piston bore, moves.

The turbine may be configured such that gas in the actuation chamber acts on the piston member to urge the piston member to move in a substantially linear manner within the actuation chamber so as to urge the valve member towards the closed configuration.

The piston member may comprise piston rings for sealing between the piston member and a wall of the actuation chamber.

The turbine may be configured such that at least one of the second actuator portion and the valve member comprises a curved surface which contacts the other of the second actuator portion and valve member such that an angle of contact between the second actuator portion and the valve member may change as the valve member is moved between the closed and open configurations.

In particular, the piston member of the second actuator portion may comprise a curved surface which contacts the other of the second actuator portion and valve member. The piston member may have a first end which is exposed to the gas which flows through the actuator gas passage to the second actuator portion, and a second end, opposite the first end, which includes the curved surface. The piston member may comprise a substantially spherical ball.

The actuator gas passage may be defined by a portion of the turbine housing.

The actuator gas passage may be defined by piping external to the turbine housing.

Said portion of the turbine arrangement upstream of the turbine wheel may be the turbine inlet, such that the actuator gas passage places the turbine inlet in gas flow communication with the second actuator portion.

Said location upstream of the turbine wheel may be the turbine inlet.

Said location downstream of the turbine wheel may be the turbine outlet.

The valve arrangement may be a wastegate valve arrangement.

The turbine may form part of a turbomachine such as a turbocharger or power turbine. That is to say, according to a second aspect of the disclosure there is provided a turbomachine comprising a turbine according to the first aspect of the disclosure.

According to another aspect of the present disclosure, to which any of the optional features discussed above may be applied, there is provided a turbine arrangement comprising a turbine including turbine housing defining a turbine cavity within which a turbine wheel is supported for rotation, a turbine inlet upstream of the turbine wheel and a turbine outlet downstream of the turbine wheel; a turbine wheel bypass passage configured to permit gas to bypass the turbine wheel; and a valve arrangement comprising: a valve member moveable between open and closed configurations, wherein in the open configuration gas may flow through the turbine wheel bypass passage to bypass the turbine wheel, and in the closed configuration gas is substantially prevented from flowing through the turbine wheel bypass passage; a first actuator portion connectable to an actuator for moving the valve member between the open and closed configurations; and a second actuator portion in gas flow communication with a portion of the turbine arrangement upstream of the turbine wheel via an actuator gas passage; and wherein the turbine arrangement is configured such that gas may flow from the said portion of the turbine arrangement upstream of the turbine wheel through the actuator gas passage to the second actuator portion, such that the pressure of said gas which flows through the actuator gas passage to the second actuator portion acts on the second actuator portion to urge the valve member towards the closed configuration.

BRIEF DESCRIPTION OF THE DRAWINGS

A specific embodiment of the present disclosure will now be described, by way of example only, with reference to the accompanying drawings, in which.

DETAILED DESCRIPTION OF EMBODIMENTS

Figure 1:
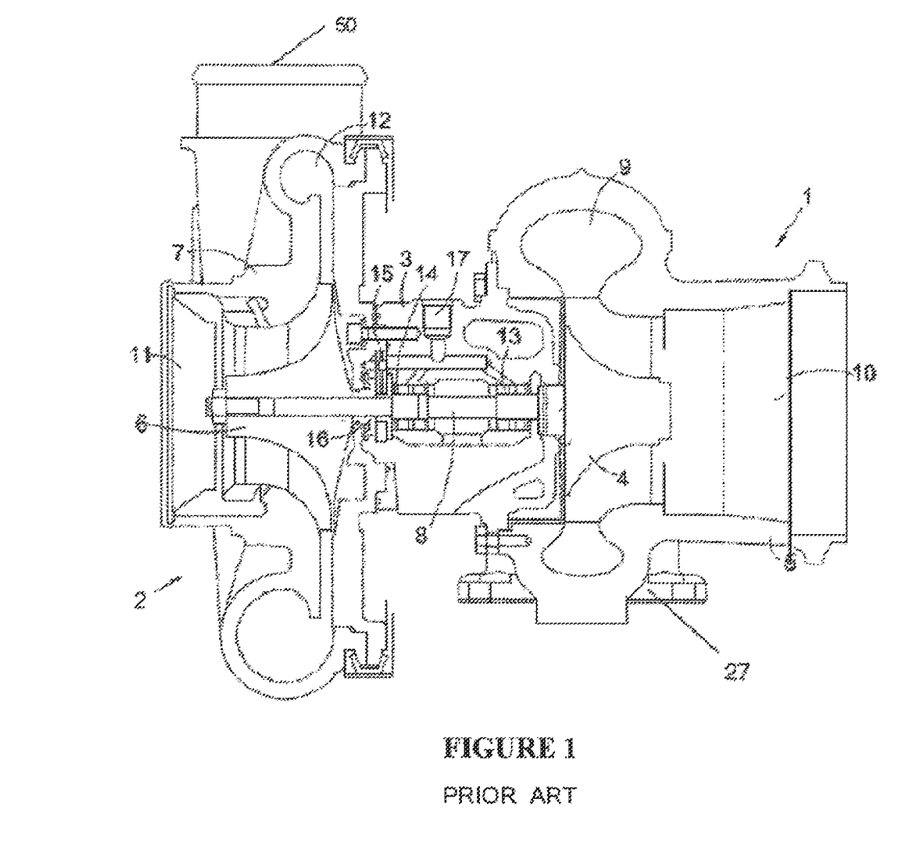
FIG. 1 shows a schematic cross section through a known turbocharger.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has an exhaust gas inlet volute 9 located annularly around the turbine wheel 4 and an axial exhaust gas outlet 10. The compressor housing 7 has an axial air intake passage 11 and a volute 12 arranged annularly around the compressor chamber. The volute 12 is in gas flow communication with a compressor outlet 50. The turbocharger shaft 8 rotates on journal bearings 13 and 14 housed towards the turbine end and compressor end respectively of the bearing housing 3. The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways 18. The oil fed to the bearing assemblies may be used to both lubricate the bearing assemblies and to remove heat from the bearing assemblies.

In use, the turbine wheel 4 is rotated by the passage of exhaust gas from the exhaust gas inlet 9 to the exhaust gas outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 50.

The exhaust gas inlet 9 is defined by a portion of the turbine housing 5 which includes a turbocharger mounting flange 27 at the end of the exhaust gas inlet 9 remote from the turbine wheel 4.

Figure 2:
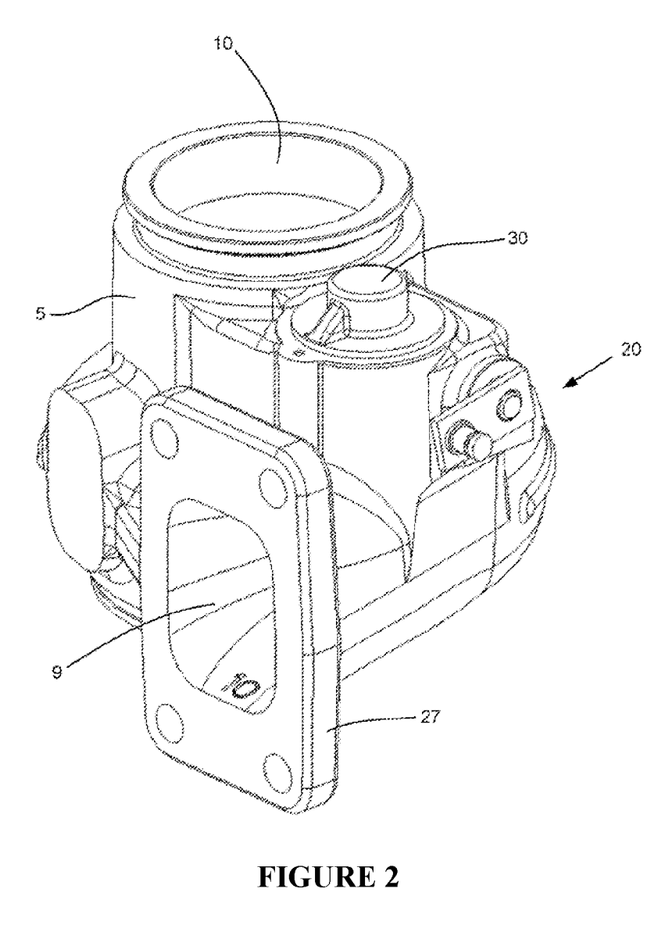
FIG. 2 shows a perspective view of the exterior of a portion of a turbocharger according to both a first and a second embodiment of the present disclosure.
Figure 3:
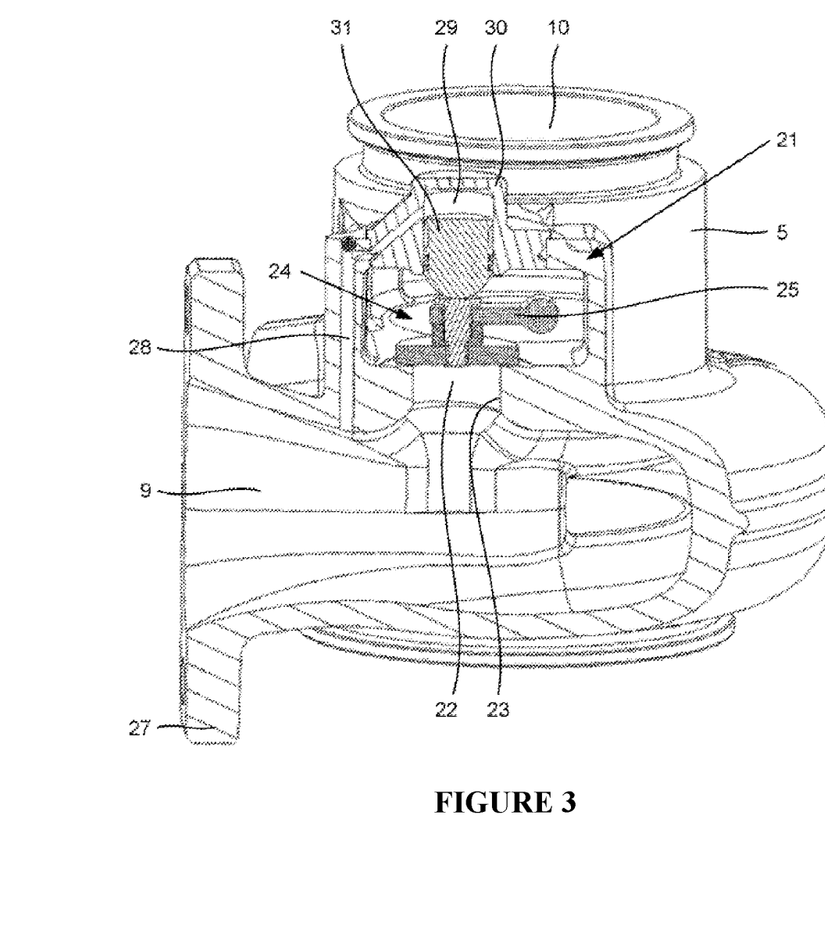
FIG. 3 shows a schematic perspective view of a cross section of a portion of a turbocharger according to the first embodiment of the present disclosure.
Figure 4:
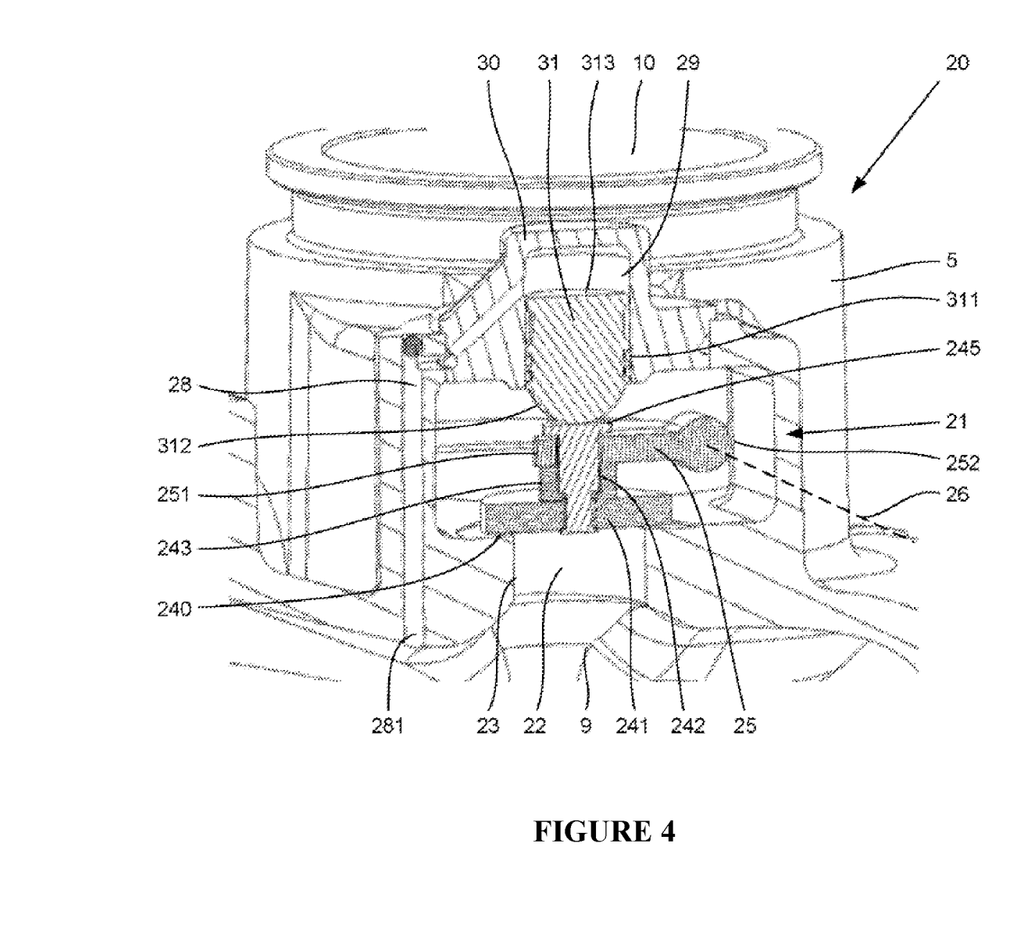
FIG. 4 shows an enlarged schematic perspective view of the cross section of the turbocharger as shown in FIG. 3.

In addition to the features of the turbine shown in FIG. 1, a turbine according to an embodiment of the present disclosure is shown in FIGS. 2-4 which includes a wastegate. In particular, the turbine 20 includes a wastegate arrangement 21 and a wastegate passage 22. Depending on its configuration (e.g. open or closed), the wastegate arrangement 21 permits the flow of exhaust gas from the inlet volute 9 to the exhaust gas outlet 10 through the wastegate passage 22 without passing the turbine wheel 4 (not shown). This reduces the energy transferred from the exhaust gas to the turbine wheel 4.

Whilst in this embodiment of the disclosure the wastegate passage permits, when desired, flow of exhaust gas from the inlet volute of the turbine to the exhaust gas outlet of the turbine through the wastegate passage without passing the turbine wheel (i.e. such that exhaust gas bypasses the turbine wheel), it will be appreciated that in other embodiments the wastegate passage may permit exhaust gas to bypass the turbine in any appropriate manner. For example, in some embodiments the turbine may form part of an engine exhaust system such that the turbine wheel is connected to the exhaust manifold of an engine by any appropriate conduit. One end of the wastegate passage may be connected to any portion of the conduit linking the exhaust manifold to the turbine wheel. The other end of the wastegate passage may be connected to any appropriate exhaust location downstream of the turbine wheel. In some embodiments, instead of the wastegate passage being connected downstream of the turbine wheel (for example to the turbine outlet), the wastegate passage may lead directly to atmosphere. From the above, it will be appreciated that the disclosure covers any wastegate passage which can, when desired, permit exhaust gas produced by an engine to flow via the wastegate passage away from the turbine wheel (instead of to the turbine wheel of the turbine).

The wastegate passage 22 includes an aperture 23 defined by the turbine housing 5 that interposes and connects the inlet volute 9 and the exhaust gas outlet 10. The wastegate arrangement 21 includes a moveable valve member 24 comprising a valve plate 241, and has an open and a closed configuration. When the wastegate arrangement 21 is in the closed configuration (as shown in FIGS. 3 and 4), the valve plate 241 abuts the turbine housing 5 on the side of the exhaust gas outlet 10 to cover the wastegate passage 22. The valve plate 241 contacts a valve seat 240 to substantially prevent gas flow from the inlet volute 9 to the exhaust gas outlet 10 via the wastegate passage 22. When the wastegate arrangement 21 is in the open configuration, the valve member 24 is positioned such that the valve plate 241 is substantially clear of the valve seat 240 (for example, such that it is not in contact with the valve seat 240).

The valve plate 241 is formed of a cylindrical plate having a diameter greater than that of the aperture 23. When the wastegate arrangement 21 is in the closed configuration the valve plate 241 and the aperture 23 are concentrically aligned.

The valve member 24 further comprises an upright 242 fastened to the valve plate 241, and a bush 243 interposing the valve plate 241 and the upright 242. The valve upright 242 is connected to an actuator arm 25 having a first end 251 comprising an annular passage through which fits a tubular portion of the upright 242. A second end 252 of the actuator arm 25 is rotatable around an axis 26 running substantially perpendicular to the axis of rotation of the turbine wheel 4 (not shown).

In order to place the wastegate arrangement 21 in the open configuration, pivotal movement of the actuator arm 25 about the axis 26 effects movement of the valve plate 241 away from the valve seat 240 by contacting the upright 242. Likewise, in order to place the wastegate arrangement 21 in the closed configuration, pivotal movement of the actuator arm 25 about the axis 26 effects movement of the valve plate 241 towards the valve seat 240 by contacting the bush 243. In both cases, the torque required to effect rotation of the actuator arm 25 is supplied by an external actuator (not shown) which may be connected to the actuator arm 25 either directly or via a linkage.

Figure 5:
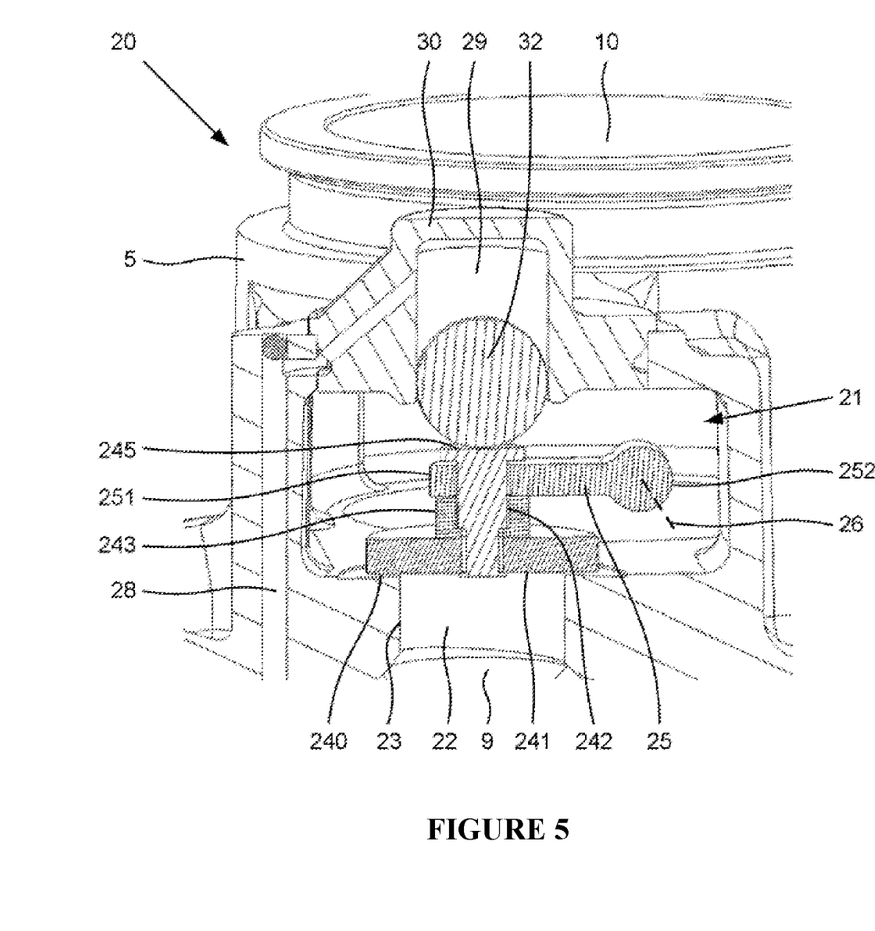
FIG. 5 shows a schematic perspective view of a cross section of a portion of a turbocharger according to the second embodiment of the present disclosure.

A wastegate cover 30 defines an actuation chamber 29 concentric to the aperture 23 of the wastegate passage 22. The wastegate cover 30 may be formed separately to the turbine housing 5 (as shown in FIGS. 3-5) or the wastegate cover 30 and the turbine housing 5 may be formed as one piece. A gas passage 28 (which may also be referred to as an actuator gas passage) extends between the actuation chamber 29 and the inlet volute 9 to allow gas flow communication between the actuation chamber 29 and the inlet volute 9. The gas passage 28 comprises a gas passage opening 281 defined by the turbine housing 5. The gas passage opening 281 allows gas from the inlet volute 9 to enter the gas passage 28 and hence reach the actuation chamber 29. In other embodiments, the gas passage may be connected to any suitable source of gas. The source of gas may be a source of gas at a pressure greater than the pressure of the gas within the wastegate passage. In some embodiments, the gas passage opening 281 may be located at any point in the exhaust gas network upstream of the turbine wheel 4. For example, in some embodiments the turbine may form part of an engine exhaust system such that the turbine wheel is connected to the exhaust manifold of an engine by any appropriate conduit. The gas passage opening may be connected to any portion of the conduit linking the exhaust manifold to the turbine wheel. In some embodiments of the disclosure, such as that shown in FIGS. 3-5, it is preferable that the gas passage opening is located upstream (with respect to the flow of exhaust gas through the system in use) of the wastegate passage.

A piston 31 (which may also be referred to as a piston member) is constrained to move within the actuation chamber 29; the piston 31 and the actuation chamber 29 being of substantially circular cross-section. The piston 31 comprises piston rings 311 to minimize gas leakage around the piston 31 from the actuation chamber 29 to the exhaust gas outlet 10. The piston 31 comprises a lower portion 312 which in use contacts a top face 245 of the valve member 24 such that force may be transferred from the piston 31 to the valve member 24 and vice versa. The lower portion 312 of the piston 31 is domed to accommodate changes in contact angle between the piston 31 and the valve member 24 when the valve member 24 is moved by the actuator arm 25.

In use, the pressure of the gas entering the turbine, having a pressure Pin, is greater than the pressure of the gas exiting the turbine, having a pressure Pout. When the wastegate is open, it is this pressure difference that drives the transfer of gas from the inlet volute 9 to the exhaust outlet 10 via the wastegate passage 22.

The piston 31 comprises a top surface 313 in gas flow communication with the inlet volute 9 and substantially sealed from the exhaust outlet 10 by the piston rings 311. The gas passage 28 ensures that the pressure of the gas in the actuation chamber 29 is substantially the same pressure as the gas entering the turbine via the inlet volute 9. The gas pressure in the actuation chamber 29 exerts a force, Fp, on the top surface of the piston 29 perpendicular to the surface 313 and parallel to the direction of travel of the piston 31 in the direction of the valve member 24. The force Fp is the product of the gas pressure in the actuation chamber 29 having a value Pin, and the projected area Ap of the piston 31 normal to a second direction. This is such that:

$$Fp = PinAp \qquad (1)$$

In the current embodiment the second direction (i.e. the direction of movement of a second actuator portion in the form of piston 31) is parallel to the longitudinal axis of the piston 31. As such, the projected area Ap of the piston 31 normal to the second direction is the cross-sectional area of the piston 31. It will be appreciated that in an alternative embodiment forming part of the present disclosure the second direction (i.e. the direction in which the second actuator portion can move as a result of gas in the actuation chamber acting upon it) may not be parallel to a longitudinal axis of a piston. In this case the projected area Ap of the piston 31 normal to the second direction will be an area which is not the cross-sectional area of the piston perpendicular to (or normal to) the longitudinal axis of the piston.

Similarly, when the wastegate arrangement 21 is in the closed configuration, the pressure of the gas entering the inlet volute 9, having a pressure Pin, exerts a force Fw on the valve plate 241 parallel to the direction of travel of the valve member 24. This force Fw is equal to the product of the pressure Pin and the projected area Aw of the valve plate 241 exposed to gas at the inlet pressure Pin that is normal to the first direction, such that:

$$Fw=PinAw \qquad (2)$$

The area Aw of the valve plate 241 that is exposed to gas at the inlet pressure Pin is defined by the aperture 23. In the present embodiment the first direction (i.e. the direction of movement of the valve member 24 at the moment the valve member 24 contacts the turbine housing 5) is perpendicular to the valve seat 240. Hence Aw is the projected area of the aperture 23 normal to the first direction, and is the area of the aperture 23. It will be appreciated that in an alternative embodiment forming part of the present disclosure the first direction may be non-perpendicular to the valve seat 240. In such a case Fw is the component of the total force exerted by the gas on the valve plate 241 that acts in the first direction. The area Aw is therefore the projected area of the aperture 23 in the direction of the force Fw.

During use the force Fp acts to close the wastegate arrangement 21 and the force Fw acts to open the wastegate arrangement 21. It will be appreciated therefore, that the two forces, acting in substantially opposite directions, sum to produce a net force Fnet acting on the wastegate arrangement 21 such that:

$$Fnet=Fw-Fp \qquad (3)$$

The convention is adopted within this document that forces acting to open the wastegate arrangement 21 act in the positive direction, and forces acting to close the wastegate arrangement 21 act in the negative direction. Such a convention aids with explaining the disclosure, but relates only to a way of modelling the disclosure and is not necessary for the disclosure to function.

In a first variation of the present embodiment, the turbine 20 is configured such that the area Aw is larger than the area Ap. When the wastegate arrangement 21 is in the closed configuration, this produces a positive net force +Fnet. It will be appreciated that the net force +Fnet is reduced from the full value of the wastegate opening force Fw by the piston force opposing it Fp, such that the force required by the actuator arm 25 to maintain the wastegate arrangement 21 in the closed configuration is lower than if the described arrangement were not in place. In a second variation of the present embodiment, the turbine 20 is configured such that the area Aw is substantially equal to the area Ap. When the wastegate arrangement 21 is in the closed configuration, this produces a force Fnet that is substantially zero. As such the wastegate arrangement 21 is held in the closed configuration by the force Fp alone, and an actuation force is only applied to the actuator arm 25 when the wastegate arrangement 21 is required to be held in the open configuration.

In a third variation of the present embodiment, the turbine 20 is configured such that the area Aw is less than the area Ap. When the wastegate arrangement 21 is in the closed configuration, this produces a negative net force −Fnet. As such the wastegate arrangement 21 is held in the closed configuration by the force Fp alone, and an actuation force is only applied to the actuator arm 25 when the wastegate arrangement 21 is required to be moved to or held in the open configuration.

FIG. 5 shows a cross section of a turbine wastegate according to a second embodiment of the present disclosure. The same numbering is used in FIG. 5 for the equivalent features of the first embodiment, as shown in FIGS. 2-4. In the embodiment of FIG. 5, a substantially spherical ball 32 is moveable within the actuation chamber 29. The diameter of the ball 32 is such that gas leakage from the actuation chamber 29 to the exhaust gas outlet 10 is minimized. A portion of the ball 32 sits in contact with the top face 245 of the valve upright 242 such that axial force is transferrable between the upright 242 and the ball 32. A further portion of the ball 32 is exposed to gas in the actuation chamber 29 at the inlet volute pressure Pin, which exerts an axial force Fb on the ball 32 longitudinal to the actuation chamber 29. This force Fb is the product of the gas pressure Pin and the cross-sectional area Ab of the ball 32.

$$Fb=PinAb \qquad (4)$$

It will be appreciated that a net force Fnet is produced upon the wastegate arrangement 21 in the same manner as the previous embodiment. Furthermore, it would be apparent to the skilled person that it is possible to vary the areas Ab and Aw to achieve zero or negative net force Fnet, as described in the variations of the first embodiment of the present disclosure. It will be appreciated that for both described embodiments of the disclosure above, the pressure in the actuation chamber 29 may be lower than the pressure in the inlet volute 9 due to frictional losses caused by gas flow through the gas passage 28. The total pressure loss to friction ΔP will depend on the geometry and flow conditions of the gas passage 28. The net force Fnet is therefore dependent on the pressure loss ΔP, the inlet pressure Pin and the projected areas Aw and Ap, such that:

$$Fnet=PinAw-(Pin-\Delta P)Ap$$

However, the pressure lost to friction ΔP will be small in comparison to the inlet pressure Pin, and, for the purpose of illustrating the disclosure above, is negligible.

Furthermore, during use, the pressure of the gas entering the turbine 20 may fluctuate. This may cause, in turn, a variation between the pressure of the gas in the actuation chamber 29 and the pressure of the gas in the inlet volute 9. For example, a pressure wave caused by one of the cylinders of an engine outputting exhaust gas may enter the turbine 20 and diverge at the gas passage opening 281, such that a portion of the wave passes through the inlet volute 9 and a portion of the wave passes through the gas passage 28. The length of the gas passage 28 may be greater than the distance between the gas passage opening 281 and the wastegate passage 22. In such case the pressure wave will reach the wastegate passage 22 before reaching the actuation chamber 29, resulting in a pressure variation between the actuation chamber 29 and the wastegate passage 22. However, the duration of this variation may be relatively small due such that the pressure variation is negligible. However, in some embodiments the length of the gas passage 28 may be chosen so that the time at which a pressure wave reaches the valve plate 241 (via the turbine inlet) is substantially the same as the time at which said pressure wave reaches the second actuator portion of the wastegate arrangement 21 (e.g. surface 313 or surface of ball 32 exposed to gas by the gas passage 28). This occurs, for example, when the distance between the gas passage opening 281 and the second actuation portion of the wastegate arrangement divided by the speed of the pressure wave through the gas passage is substantially equal to the distance between the gas passage opening and the valve plate divided by the speed of the pressure wave through the inlet between the gas passage opening and the valve plate. As will be appreciated by a person skilled in the art, the pressure wave speed will be dependent on fluid mechanics of the system, for example, gas properties such as local temperature, viscosity, compressibility, and so the velocities of the diverged pressure waves may vary (for example, if the gas properties and/or path structure is different for the diverged pressure waves).

It will further be appreciated that the pressure in the actuation chamber 29 will be affected by the position of the gas passage opening 281 relative to the wastegate passage 22. For example, the gas passage opening 281 may be positioned in a portion of the turbine housing 5 that does not form part of the inlet volute 9, such as by the turbine mounting flange 27. In this case, the pressure of the gas in the actuation chamber 29 may be greater than the pressure of the gas in the turbine inlet 9 acting on the valve plate 241. This may be due to frictional losses which occur as gas flows through the inlet volute between the location of the gas passage opening 281 and the wastegate passage 22, and the Venturi effect caused by constriction of the inlet volute 9 flow area. In another embodiment, the gas passage opening 281 may be upstream of the turbine wheel 4 but downstream of the wastegate passage 22. When the wastegate arrangement 21 is in the open configuration, the gas pressure adjacent the gas passage opening 281 will be substantially less than the gas pressure upstream of the wastegate passage 22, due to exhaust gas bypassing the turbine wheel 4.

In both embodiments of the present disclosure discussed above and as shown by FIGS. 2-5, the actuation chamber 29 and piston 31 (or spherical ball 32) have circular cross-sections; however it will be appreciated that a piston/cylinder arrangement having any substantially constant cross-section may form part of the present disclosure.

Although the previous descriptions are related to embodiments of a turbine according to the present disclosure in which the wastegate arrangement 21 allows exhaust gas to vent from the inlet volute 9 to the exhaust gas outlet 10, it will be appreciated that a turbine according to the present disclosure may allow exhaust gas to vent from the inlet volute 9 to the atmosphere without passing through the exhaust gas outlet 10.

Although the previous descriptions are related to embodiments of a turbine according to the present disclosure which form part of a turbocharger, it will be appreciated that a turbine according to the present disclosure may form part of any appropriate turbomachine. For example, a turbine according to the present disclosure may form part of a turbomachine which does not include a compressor. In particular, a turbine according to the present disclosure may form part of a power turbine, for example a power turbine which converts the rotation of a turbine wheel into electrical power.

Although the above described embodiments relate to a turbine which operates in conjunction with gas, it will be appreciated that turbines according to the present disclosure may operate in conjunction with any appropriate fluid, for example a liquid.

In some embodiments the gas passage may include a gas flow control device, such as, but not limited to, a valve, which has an open configuration which permits gas to flow from the turbine inlet to the second actuator portion via the gas passage, and a closed configuration which substantially prevents gas from flowing from the turbine inlet to the second actuator portion via the gas passage. In certain applications it may be desirable to control the gas flow control device to selectively enable or disable the second actuator portion. Furthermore, in certain applications it may be desirable to control the gas flow control device to control the extent to which the second actuator portion is acted upon by gas which flows through the gas passage, and hence control the extent to which the second actuator portion urges the valve member towards the closed configuration.

Although the above described embodiments relate to a turbine arrangement including a valve arrangement (e.g. wastegate valve arrangement) having a flap type valve in which the valve member is moved between the open and closed configurations by the rotation of an actuator arm, it will be appreciated that a turbine arrangement according to the present disclosure may include any appropriate valve arrangement and associated actuator. For example, in some embodiments, the valve arrangement may not include a flap type valve. The valve arrangement may include a poppet type valve in which movement of the valve member is linear. Other possible types of valve include, but are not limited to, a spool valve, a sleeve valve and a rotary valve. Alternatively, the valve arrangement may include a valve of the type that is used as part of an exhaust gas recirculation system.

It will further be appreciated that although the valve member of the above described embodiments includes a flat valve plate which is received by an annular valve seat to form a seal, any appropriate valve member may be used. For example, the valve member may instead comprise a frusto-conical outer surface and the valve seat may comprise a corresponding frusto-conical inner surface, such that the outer surface of the valve member is received by the inner surface of the valve seat to form a seal. In other embodiments the valve member may be a dual valve member having a generally 'arrowhead' configuration of the general type discussed in WO2007138325 in the name of the present applicant.

Although the embodiments described above relate to the turbine of a turbocharger, it will be appreciated that the disclosure applies equally to any form of turbine and turbine arrangement.

Furthermore, the embodiments described above relate to a flow passage (and associated valve arrangement) between a location upstream of the turbine wheel and a location downstream of the turbine wheel in the form of a wastegate passage. However, the disclosure may equally be applied to any type of flow passage (e.g. both flow passages between a location upstream of the turbine wheel and a location downstream of the turbine wheel, and flow passages not between a location upstream of the turbine wheel and a location downstream of the turbine wheel) and any appropriate associated valve arrangement. For example, the disclosure may be applied to an EGR flow passage and associated EGR valve arrangement, or an exhaust diverter/bypass flow passage and associated valve for a modulated two stage turbine arrangement, or for a wastegate/bypass flow passage with a poppet valve type and associated wastegate/bypass valve arrangement.

In the described embodiments, the second actuator portion is in gas flow communication with a portion of the turbine arrangement upstream of the turbine wheel (in particular, the turbine inlet) via the actuator gas passage. In other words, the actuator gas passage places the second actuator portion in gas flow communication with a source of pressurized gas (in this case gas upstream of the turbine wheel). In some embodiments, the actuator gas passage may connect the second actuator portion to any appropriate source of pressurized gas—for example, the source of pressurized gas may be gas from a pressurized gas store, gas compressed by the compressor of a turbocharger or exhaust gas taken directly from the cylinder of an engine.

What is claimed is:

1. A turbine arrangement comprising:
    a turbine including turbine housing defining: a turbine cavity within which a turbine wheel is supported for rotation, a turbine inlet upstream of the turbine wheel, and a turbine outlet downstream of the turbine wheel;
    a flow passage between a location upstream of the turbine wheel and a location downstream of the turbine wheel configured to permit gas to flow from said location upstream of the turbine wheel to said location downstream of the turbine wheel without interacting with the turbine wheel; and
    a valve arrangement comprising:
        a valve member moveable between open and closed configurations, wherein in the open configuration gas may flow from said location upstream of the turbine wheel to said location downstream of the turbine wheel through the flow passage, and in the closed configuration gas is substantially prevented from flowing through the flow passage;
        a first actuator portion connectable to an actuator for moving the valve member between the open and closed configurations; and
        a second actuator portion in gas flow communication with a portion of the turbine arrangement upstream of the turbine wheel via a actuator gas passage; and
    wherein the turbine arrangement is configured such that gas may flow from said portion of the turbine arrangement upstream of the turbine wheel through the actuator gas passage to the second actuator portion, such that the pressure of said gas which flows through the actuator gas passage to the second actuator portion acts on the second actuator portion to urge the valve member towards the closed configuration.

2. A turbine arrangement according to claim 1, wherein the turbine housing comprises an aperture defining a portion of the flow passage such that when the valve member is in the closed configuration the aperture is covered by the valve member such that the valve member and the turbine housing form a seal that substantially prevents gas flowing through the flow passage.

3. A turbine arrangement according to claim 2, wherein the turbine housing defines a valve seat, and wherein, in the closed configuration, the valve member contacts the valve seat to form said seal that substantially prevents gas flowing through the flow passage.

4. A turbine arrangement according to claim 2, wherein the valve member moves in a first direction between said open configuration and said closed configuration.

5. A turbine arrangement according to claim 4, wherein the second actuator portion moves in a second direction relative to the valve arrangement.

6. A turbine arrangement according to claim 5, wherein when the valve member is in the closed configuration, the projected area of the aperture normal to the first direction is larger than the projected area of the second actuator portion normal to the second direction, such that the net force exerted on the valve member urges the valve member towards the open configuration.

7. A turbine arrangement according to claim 5, wherein when the valve member is in the closed configuration, the projected area of the aperture normal to the first direction is substantially equal to the projected area of the second actuator portion normal to the second direction, such that zero net force is produced on the valve member.

8. A turbine arrangement according to claim 5, wherein when the valve member is in the closed configuration, the projected area of the aperture normal to the first direction is smaller than the projected area of the second actuator portion normal to the second direction, such that the net force exerted on the valve member urges the valve member towards the closed configuration.

9. A turbine arrangement according to claim 1, wherein the first actuator portion comprises an arm mounted for rotation such that rotation of the arm causes movement of the valve member between the open and closed configurations.

10. A turbine arrangement according to claim 1, wherein the second actuator portion is directly coupled to the valve member.

11. A turbine arrangement according to claim 1, wherein the second actuator portion is coupled to the valve member via a linkage.

12. A turbine arrangement according to claim 1, wherein the second actuator portion comprises a piston member supported for movement within an actuation chamber, wherein the actuator gas passage connects said portion of the turbine arrangement upstream of the turbine wheel to the actuation chamber, such that gas in the actuation chamber acts on the piston member to urge the piston member to move within the actuation chamber so as to urge the valve member towards the closed configuration.

13. A turbine arrangement according to claim 12, wherein gas in the actuation chamber acts on the piston member to urge the piston member to move in a substantially linear manner within the actuation chamber so as to urge the valve member towards the closed configuration.

14. A turbine arrangement according to either claim 12, wherein the piston member further comprises piston rings for sealing between the piston member and a wall of the actuation chamber.

15. A turbine arrangement according to claim 1, wherein at least one of the second actuator portion and the valve member comprises a curved surface which contacts the other of the second actuator portion and valve member such that an angle of contact between the second actuator portion and the valve member may change as the valve member is moved between the closed and open configurations.

16. A turbine arrangement according to claim 12, wherein the piston member comprises a substantially spherical ball.

17. A turbine arrangement according to claim 1, wherein the actuator gas passage is defined by a portion of the turbine housing.

18. A turbine arrangement according to claim 1, wherein the actuator gas passage is defined by piping external to the turbine housing.

19. A turbine arrangement according to claim 1, wherein said portion of the turbine arrangement upstream of the turbine wheel is the turbine inlet, such that the actuator gas passage places the turbine inlet in gas flow communication with the second actuator portion.

20. A turbine arrangement according to claim 1, wherein said location upstream of the turbine wheel is the turbine inlet.

21. A turbine arrangement according to claim 1, wherein said location downstream of the turbine wheel is the turbine outlet.

22. A turbine arrangement according to claim 1, wherein the turbine forms part of a turbocharger or power turbine.

* * * * *